United States Patent
Wasserman

(10) Patent No.: US 7,814,512 B2
(45) Date of Patent: Oct. 12, 2010

(54) DYNAMIC ADJUSTMENT OF EPG LEVEL OF DETAIL BASED ON USER BEHAVIOR

(75) Inventor: Steven Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1946 days.

(21) Appl. No.: 10/260,255

(22) Filed: Sep. 27, 2002

(65) Prior Publication Data

US 2004/0073923 A1 Apr. 15, 2004

(51) Int. Cl.
*H04N 5/445* (2006.01)
(52) U.S. Cl. .............................. 725/46; 725/47; 725/50; 725/54
(58) Field of Classification Search ..................... 725/46
See application file for complete search history.

(56) References Cited

U.S. PATENT DOCUMENTS

| | | | | |
|---|---|---|---|---|
| 5,038,211 A * | 8/1991 | Hallenbeck | ................. | 348/460 |
| 5,652,613 A * | 7/1997 | Lazarus et al. | ................. | 725/50 |
| 6,025,837 A * | 2/2000 | Matthews et al. | ........... | 715/721 |
| 6,457,010 B1 | 9/2002 | Eldering et al. | | |
| 6,665,870 B1 * | 12/2003 | Finseth et al. | ................. | 725/40 |
| 6,727,914 B1 * | 4/2004 | Gutta | .......................... | 715/719 |
| 6,928,653 B1 * | 8/2005 | Ellis et al. | ...................... | 725/50 |
| 6,934,964 B1 * | 8/2005 | Schaffer et al. | ............... | 725/46 |
| 7,571,452 B2 * | 8/2009 | Gutta | .......................... | 725/46 |
| 2002/0184625 A1 * | 12/2002 | Allport | ........................ | 725/39 |
| 2003/0084450 A1 * | 5/2003 | Thurston et al. | .............. | 725/46 |
| 2003/0184578 A1 * | 10/2003 | Cowperthwaite | ............ | 345/721 |
| 2006/0206912 A1 * | 9/2006 | Klarfeld et al. | ............... | 725/40 |

* cited by examiner

*Primary Examiner*—John W Miller
*Assistant Examiner*—Oschta Montoya
(74) *Attorney, Agent, or Firm*—Lee & Hayes, PLLC

(57) ABSTRACT

Systems and methods described herein related to dynamically adjusting levels of detail of content event descriptions contained in an EPG according to a user's behavior. Predictions are made based on the user's behavior as to which content events the user may desire to see a more detailed description for. Rankings are assigned to future events based on the user's behavior. When it comes time to update the EPG (i.e., download event descriptions for one or more new time periods), the rankings are utilized to determine which events should have event descriptions of a greater detail stored for them. Memory is more efficiently utilized by having high level event descriptions available for events in which the user is likely to be interested and low level event descriptions available for events in which the user is probably not interested.

33 Claims, 6 Drawing Sheets

| EVENT TITLE 400 |
|---|
| EVENT SYNOPSIS 408 |
| EVENT DAY 402 |
| START TIME 404 |
| RUN TIME 406 |

1st Level of Detail
Description
(Base EPG)
122

| EVENT TITLE 400 |
|---|
| EVENT DAY 402 |
| START TIME 404 |
| RUN TIME 406 |
| EVENT SYNOPSIS 408 |
| YEAR RELEASED 410 |
| PRIMARY CAST 412 |

2nd Level of Detail
Description
124

| EVENT TITLE 400 |
|---|
| EVENT DAY 402 |
| START TIME 404 |
| RUN TIME 406 |
| EVENT SYNOPSIS 408 |
| YEAR RELEASED 410 |
| PRIMARY CAST 412 |
| DIRECTOR/ARTIST / PRODUCER(S) 414 |
| SECONDARY CAST 416 |

3rd Level of Detail
Description
126

| EVENT TITLE 400 |
|---|
| EVENT DAY 402 |
| START TIME 404 |
| RUN TIME 406 |
| EVENT SYNOPSIS 408 |
| YEAR RELEASED 410 |
| PRIMARY CAST 412 |
| DIRECTOR/ARTIST / PRODUCER(S) 414 |
| SECONDARY CAST 416 |
| OTHER EVENTS BY SAME DIRECTOR OR ARTIST 418 |
| OTHER SHOW TIMES 420 |
| MISC OTHER INFO 422 |

4th Level of Detail
Description
128

Fig. 4

DYNAMIC ADJUSTMENT OF EPG LEVEL OF DETAIL BASED ON USER BEHAVIOR

TECHNICAL FIELD

The systems and methods described herein generally relate to providing event descriptions with an Electronic Programming Guide (EPG) that is associated with content events broadcast over a content broadcast network. More particularly, the systems and methods described herein relate to dynamically adjusting levels of detail of event descriptions contained in an EPG according to a user's behavior.

BACKGROUND

Broadcasters such as cable television companies typically provide a user interface called an Electronic Program Guide (EPG) that allows subscribers to conveniently ascertain what events are available on their network at present and in the near future. EPGs often display their data in a grid with rows of the grid representing available channels and columns representing time periods, such as a half hour or hour. In each cell of the grid, the EPG displays the title of the event that will air at the corresponding time and channel.

In addition to event titles, EPGs typically offer more detailed descriptions of content. These detailed descriptions may be accessed in a variety of ways, such as positioning a highlight cursor over the cell that displays the title of the event or pressing an information button while viewing an event.

To be readily available to the user, the information contained in the event descriptions is stored on a client device on the broadcast network, which is normally a set top box connected to a television set. In most cases, the memory available for event descriptions is quite limited. The total amount of memory available in typical set top boxes today is 314 Kb to 16 Mb, with much of that occupied by other code and data for other non-EPG functions.

Modern broadcast networks may carry hundreds of events at a time. Because of this large capacity, the working set of data required to facilitate an EPG for even a relatively short period of programming consists of thousands of event descriptions. The limited memory in the set top box ultimately restricts the number of event descriptions and the detail of those descriptions that can be made available to the viewer.

Because viewers are typically interested in only a small percentage of the programming offered, the majority of the data are never displayed; thus, the large quantity of irrelevant data that must be stored on the client reduces the quality of event descriptions for events of interest to the user.

SUMMARY

Systems and methods described herein relate to dynamically selecting the level of detail for individual event descriptions stored on a client device. The decision to store a more detailed (and larger) event description is controlled by a prediction made based on the user's past viewing habits and available memory. Initially, the client device downloads and stores a base-level EPG database consisting only of simple (small) descriptions for all programming events. For those events that a prediction algorithm determines are more likely to be watched, the client downloads and stores a more detailed version of the event description if sufficient memory is available. Memory is more efficiently utilized by having detailed event descriptions available for events in which the user is likely to be interested and simple event descriptions available for events that are probably of lesser interest. Each client device on a network may have an entirely different set of detailed descriptions. In cases where more than two levels of detail are available, the prediction process also determines which level of detail should be downloaded for each event.

The prediction process ranks each event according to how likely the viewer is to be interested in it. A serial event that the viewer regularly watches, for example, would receive a higher rank than a serial event that the user seldom or never watches. Other factors, such as an airing time that occurs during a time period when the viewer often watches or a channel number that the viewer favors would increase the rank of an event. Events for which information has been viewed in the past could be ranked higher. These factors form a good basis for prediction because viewing behavior typically involves only a small subset of programming that is highly correlated from week to week.

Additionally, a content provider may identify some events as recommended events, or "best bets" in which a user will likely be interested. If such a recommendation is identified by the client, then a ranking for each best bet would be higher than the base ranking.

There are many other data the can be monitored by the EPG application and used to determine the rank of an event. For example, EPG listings often contain genre information (such as drama, sports, documentary, etc . . . ). Events belonging to commonly watched genres could have their rank increased accordingly. Favorite actors, directors, and the like could also be taken into account when ranking an event.

A user may also make a request to have enhanced levels of detail event descriptions available for certain events. For example, a user may elect to have more detailed event descriptions available for movies, sporting events, etc. In this case, future content events so identified will have their rankings increased.

Once rankings are established, the client downloads one or more detailed descriptions for the highest ranked event(s). To utilize memory more efficiently, the basic description of an event is deleted when its enhanced event description is downloaded. Since the enhanced event description will require more memory than the basic event description, either the base-level EPG can be sized to leave extra space for enhanced descriptions, or portions of the EPG that are least likely to be accessed can be selectively erased. For example, if memory is needed for an enhanced description, then event descriptions farthest in the future may be erased, or event descriptions on never-watched channels my be erased, or both. The process continues down the rankings until no more memory can be made available for enhanced descriptions.

This summary itself is not intended to limit the scope of this patent. Moreover, the title of this patent is not intended to limit the scope of this patent. For a better understanding of the present systems and methods, please see the following detailed description and appending claims, taken in conjunction with the accompanying drawings. The scope of the present implementations is pointed out in the appending claims.

BRIEF DESCRIPTION OF THE DRAWINGS

The same numbers are used throughout the drawings to reference like elements and features.

FIG. 4 is an illustration of event information contained in EPG databases of differing level of detail.

DETAILED DESCRIPTION

In the following description, for purposes of explanation, specific numbers, materials and configurations are set forth in order to provide a thorough understanding of the present systems and methods. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present system and methods. Furthermore, for ease of understanding, certain method steps are delineated as separate steps; however, these separately delineated steps should not be construed as necessarily order dependent in their performance.

The following description sets forth one or more exemplary implementations of systems and methods for dynamic adjustment of electronic programming guide (EPG) level of detail according to client behavior that incorporate elements recited in the appended claims. These implementations are described with specificity in order to meet statutory written description, enablement, and best-mode requirements. However, the description itself is not intended to limit the scope of this patent.

The inventor intends these exemplary implementations to be examples only. The inventor does not intend these exemplary implementations to limit the scope of the claims appended hereto. Rather, the inventor has contemplated that the claimed implementations might also be embodied and/or implemented in other ways, in conjunction with other present or future technologies.

For convenience, an example of an implementation of systems and/or methods for dynamically adjusting level of detail of EPG event descriptions may be referred to herein as an "EPG with adjustable descriptions."

Exemplary Content Distribution System

Figure 1:
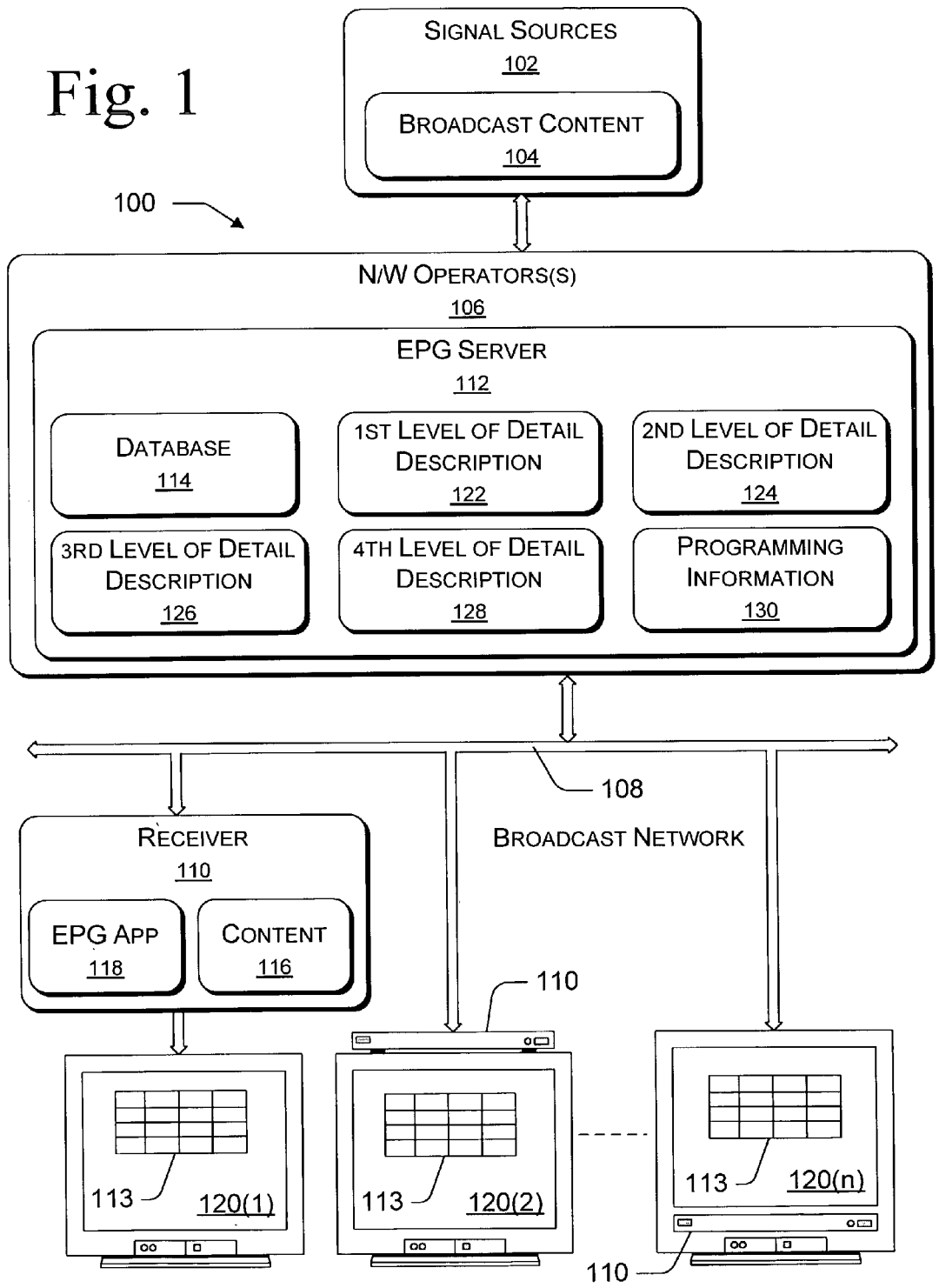
FIG. 1 is a diagram of a content distribution system for broadcasting content and an EPG signal that includes a base layer and one or more enhancement layers.

FIG. 1 is a diagram of an exemplary content distribution system 100 for broadcasting content and an EPG signal that includes a base layer and one or more enhancement layers. The one or more exemplary implementations, described herein, of the present claimed systems and methods may be implemented (in whole or in part) by the content distribution system 100.

The content distribution system 100 includes multiple signal sources 102 containing broadcast content 104 such as television programs, audio, data broadcasts, interactive content, etc. These signals are aggregated by a network operator 106 (or more than one network operator) and transmitted over a broadcast network 108 to multiple receivers 110. Examples of such network operators 106 include, but are not limited to, cable television operators and satellite direct-to-home providers. The network operator 106 includes an EPG server 112 that maintains a database 114 containing information about events available on the network 108 at the current time and in the near future. This information includes the scheduled broadcast time of the event, the programming service on which the event will be broadcast (such as MSNBC), a text description of the event, and other such information. The EPG server 112 broadcasts a signal containing the event data over the broadcast network 108. Receivers 110 receive this signal and store it as stored content 116 so that the information may be presented to viewers.

Each receiver 110 includes an EPG application 118. The EPG application 118 processes data received from the EPG server 112 and displays an EPG user interface 113 on client devices 120(1)-120 (n). A receiver 110 may be embodied in any of several ways. In one embodiment, a receiver 110 is embodied in a set top box that is connected to client device 120(2). In another embodiment, a receiver 110 is integrated with client device 120(n). Other ways in which a receiver may be embodied are not shown but should be understood to be included in the present description.

The EPG application 118 enables a television viewer to navigate through an onscreen guide to locate television shows and other network services, if available. Many EPG implementations allow the television viewer to look at schedules of current and future programming, set reminders for upcoming events, enter instructions to record television shows, and select video-on-demand movies.

In the implementation shown, database 114 includes more than one description for at least some of the events in the database. The database 114 includes a first level of detail description 122 for all or nearly all events. The first level of detail description 122 is a very brief narrative that takes up a relatively small amount of memory and describes the event. The collection of first level of detail descriptions of all events that appear in the EPG data broadcast will be referred to as the base layer. The term "extended description" is also used herein to refer to levels of detail descriptions other than the first level of detail description 122. The description items included in the first level of detail description 122 will be discussed in greater detail below, with respect to FIG. 4.

The database 114 also includes a second level of detail description 124 that contains more detailed information than the first level of detail description 122 and, hence, requires more memory space than the first level of detail description 122. In addition, even more detailed event descriptions may also be present in the database 114. These require even more memory than the second level of detail description 124. In the present example, a third level of detail description 126 and a fourth level of detail description 128 are included in the database 114. The different levels of detail descriptions will be discussed in greater detail below.

The database 114 contains programming information 130 for broadcast services and on-demand content listings. The EPG server 112 may contain event data for a much larger number of programs than can be stored in the receivers, and it may serve multiple channel lineup configurations. (Typically, an EPG server will contain two or more weeks of data while the most limited client devices may only be capable of storing 1 to 5 days of data.) The processing performed by the EPG server 112 may involve any number of techniques to reduce, modify, or enhance the event data contained in the database 114. Such processes might include selection of a relevant subset of events that will fit in the memory available in the client device, compression, format modification, and the like. The EPG server 112 broadcasts data from the database 114 over the broadcast network 108 using a data broadcasting protocol such as DSM-CC data carousels, Motorola Carousel File System (CFS), or Scientific Atlanta Broadcast File System (CFS). The broadcast includes the base layer descriptions plus enhanced descriptions. Base and enhanced data are not necessarily broadcast at the same rate. In order to facilitate rapid loading of base EPG data, the base layer may be transmitted at a rate much faster than the enhancement data. More detailed enhancements, in turn, may be transmitted at even lower rates.

The broadcast network 108 can include a cable television network, RF, microwave, satellite, and/or data network, such as the Internet, and may also include wired or wireless media using any broadcast format or broadcast protocol. Additionally, the broadcast network 108 can be any type of network, using any type of network topology and any network communication protocol, and can be represented or otherwise implemented as a combination of two or more networks.

Exemplary Client Device

Figure 2:
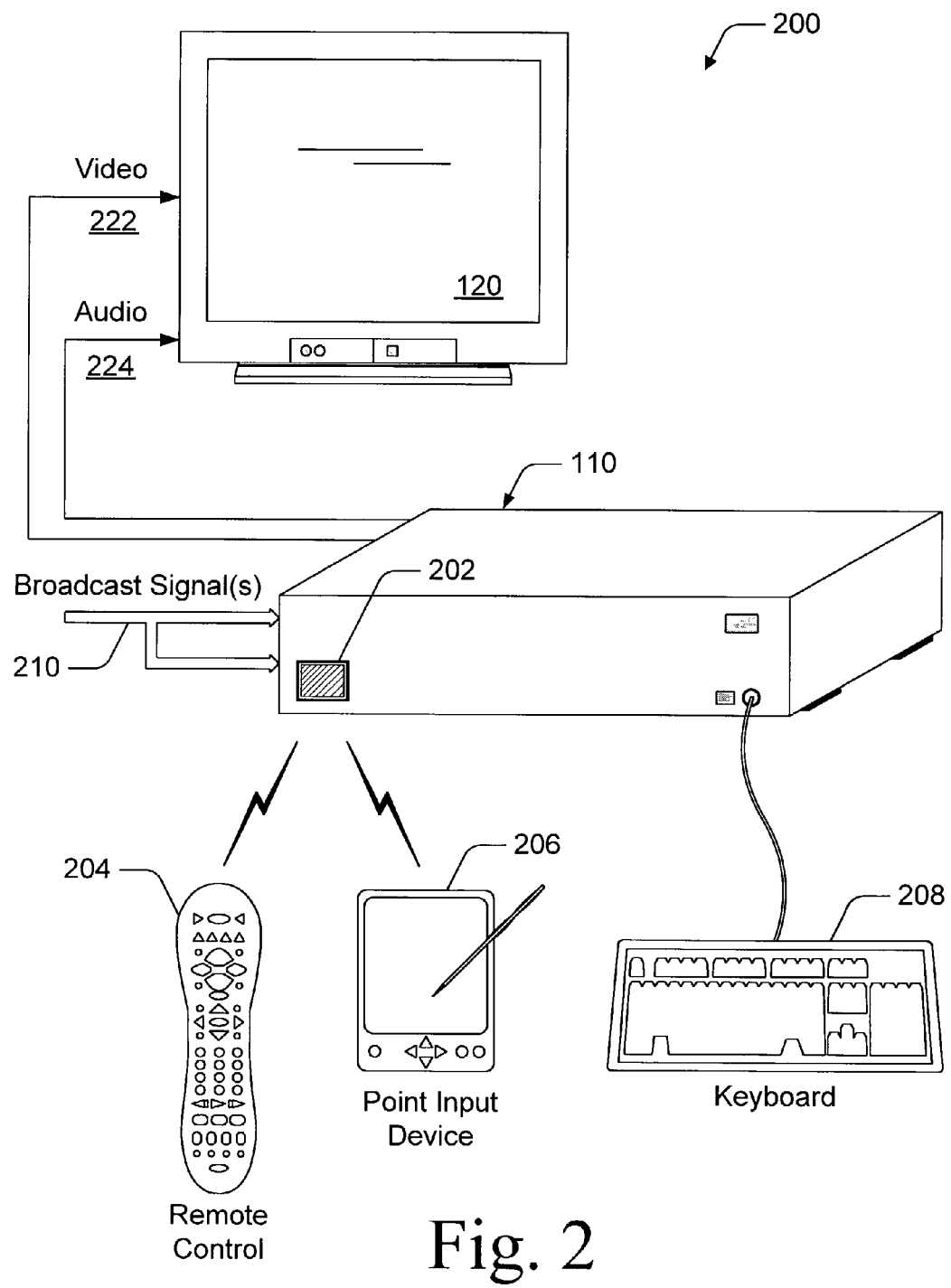
FIG. 2 is a diagram of an exemplary client device that may be utilized with the systems and method described herein.

FIG. 2 illustrates an exemplary implementation 200 of a receiver 110 (similar to those shown in FIG. 1) shown as a standalone unit (such as a set top box) that connects to a client device 120, such as a television set. The receiver 110 can be implemented in any number of embodiments, including a cable or terrestrial broadcast set-top box, a satellite receiver, a personal video recorder (PVR) and playback system, a game console, an information appliance, and so forth. The Motorola DCT-2000 and the Scientific Atlanta Explorer 2000 are examples of widely deployed client devices.

The receiver 110 includes a facility 202 for receiving communications from a remote control device 204. The remote control 204 normally communicates with the receiver 110 via a wireless infrared of radiofrequency protocol. In addition, some receivers allow wired peripherals such as a keyboard 208 to be connected with the receiver 110.

The receiver 110 receives one or more broadcast signals 210 from one or more broadcast sources, such as from a satellite or a cable television network like the broadcast network 108 shown in FIG. 1. The receiver 110 includes hardware and/or software for receiving and decoding broadcast signals 210. Broadcast signals 210 may be transmitted in an analog format such as an NTSC, PAL, SECAM, or in a digital format such as DVB, ATSC, DSS, or another television signal format. The receiver 110 includes hardware and/or software for displaying a graphical user interface by which the user can, for example, access various network services and applications, configure the receiver 110, and perform other functions.

The receiver 110 generates video signal(s) 222 and audio signal(s) 224, both of which are communicated to the client device 120. The video signals 222 and audio signals 224 can be communicated from the receiver 110 to the client device 120 via an RF (radio frequency) link, S-video link, composite video link, component video link, or other communication link. Although not shown in FIG. 2, the receiver 110 may include one or more lights or other indicators identifying the current status of the device. Additionally, the receiver 110 may include one or more control buttons, switches, or other selectable controls for controlling operation of the device.

Exemplary System—EPG with Adjustable Descriptions

Figure 3:
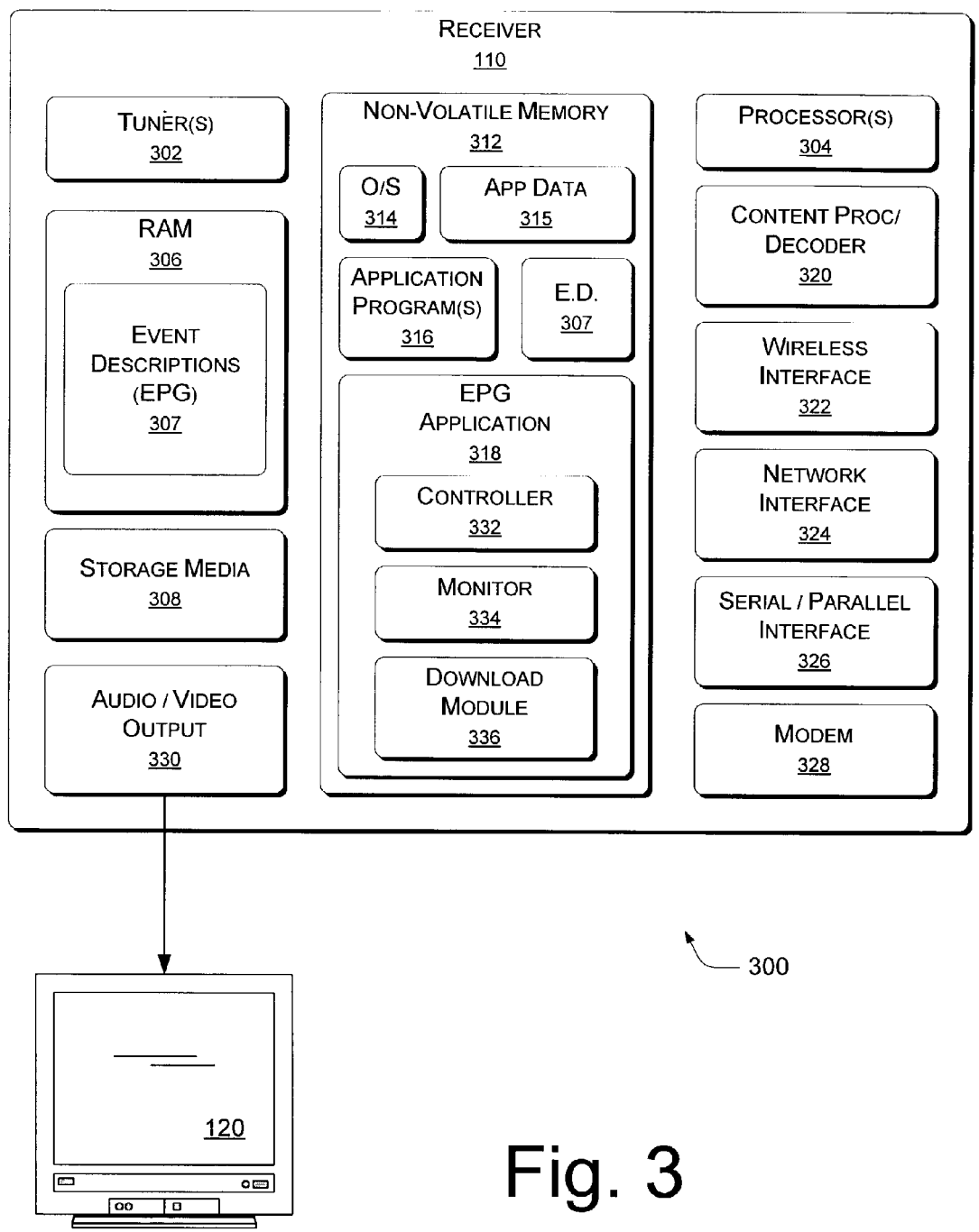
FIG. 3 is a block diagram of an exemplary system for adjusting EPG level of detail event descriptions according to client behavior.

FIG. 3 is a block diagram of an exemplary system 300 for adjusting EPG level of detail event descriptions according to client behavior. The system 300 includes selected components of the content distribution system 100, such as an exemplary receiver 110 and a client device 120 (such as a television) as shown in FIGS. 1 and 2. The receiver 110 also includes components to implement an EPG with adjustable descriptions in a television-based entertainment and information system.

The receiver 110 includes one or more tuners 302 which are representative of one or more in-band tuners that tune to various frequencies or channels to receive television and data signals. In some cases, such as in a cable television network, tuner 302 may also represent an out-of-band tuner that receives a control channel over which the event data is broadcast to the receiver 110. The receiver 110 also includes one or more processors 304 (e.g., microprocessors) which process various instructions to control the operation of the client device 104 and to communicate with other electronic and computing devices.

The receiver 110 can be implemented with one or more memory components, examples of which include a random access memory (RAM) 306, mass storage media 308, and a non-volatile memory 312 (e.g., ROM, Flash, EPROM, EEPROM, etc.). The memory components (e.g., RAM 306, storage media 308, and non-volatile memory 312) store various information and/or data such as received content, event descriptions, configuration information for the receiver 110, and/or graphical user interface information. As shown in FIG. 3, the RAM 306 stores event descriptions 307 used in the EPG 113 shown in FIG. 1. The event descriptions 307 will be discussed in greater detail below.

Alternative implementations of the receiver 110 can include a range of processing and memory capabilities, and may include any number and different memory components than those illustrated in FIG. 3. For example, full-resource clients can be implemented with substantial memory and processing resources, including a disk drive (not shown). Low-resource clients, however, may have limited processing and memory capabilities, such as a limited amount of RAM 306 and limited processing capabilities of a processor 304.

An operating system 314, application data 315 such as statistics about viewing habits and event descriptions 307, and one or more application programs 316 can be stored in non-volatile memory 312 (although they could be stored in any of the memories shown).

An EPG application 318 operates on the event data 307 to provide a program guide (FIG. 1, EPG user interface 113). The receiver 110 can also include other components pertaining to a television-based entertainment system which are not illustrated in this example. For instance, the receiver 110 can include a user interface application and user interface lights, buttons, controls, and the like to facilitate viewer interaction with the device.

The receiver 110 also includes a content processor and/or decoder 320 to process and decode broadcast video signals, such as analog or digital television signals. The content processor 320 can also include a video decoder and/or additional processors to receive, decode, and/or process audio and video content received from a network operator. The content processor 320 may include an MPEG-2 or MPEG-4 (Moving Pictures Experts Group) decoder that decodes MPEG-encoded video content Typically, video programs (or content) include video data and audio data that correspond to the video data. The content processor 320 generates video and/or display content that is formatted for display on the client device 120, and generates decoded audio data that is formatted for transmission by a broadcast device, such as one or more speakers (not shown) in client device 120. The content processor 320 can include a display controller (not shown) that processes the video and/or display content to display corresponding images on the client device 120. A display controller can include a microcontroller, integrated circuit, and/or similar video processing component to process the images. It is to be appreciated that the systems and methods described herein can be implemented for any type of encoding format as well as for data and/or content streams that are not encoded.

The receiver 110 further includes a wireless interface 322, a network interface 324, a serial and/or parallel interface 326, and a PSTN, DSL, or cable modem 328. Wireless interface 322 allows the receiver 110 to receive input commands and other information from a user-operated input device, such as from a remote control device or from another IR or similar RF input device. Network interface 324 and serial and/or parallel interface 326 allow the receiver 110 to interact and communicate with other electronic and computing devices via various communication links. Although not shown, the receiver 110 may also include other types of data communication interfaces to communicate with other devices. Modem 328 facilitates receiver 110 communications with other electronic and computing devices via a conventional telephone line, a DSL connection, or a cable modem. The receiver 110 also includes an audio and/or video output 330 that provides signals to the client device 120 or to other devices that process and/or display, or otherwise render, the audio and video data.

The EPG application 318 includes a controller 332, a monitor 334 and a download module 336. The controller 332 is the main module of the EPG application 308 and performs various functions associated with displaying an EPG, such as laying out the elements of the user interface and reacting to user input.

The monitor 334 is used to track viewing behavior that occurs on the receiver 110. In one implementation, the monitor 334 is capable of monitoring viewing behavior of different users of the receiver 110. In such an implementation, it may be required that any users of the receiver 110 log onto the receiver 110 while using the receiver 110 so that the monitor 334 can determine which user is using the receiver 110 at any particular time. In another implementation, the monitor 334 is configured to automatically determine which user is controlling the receiver 110 at a particular time.

The monitor 334 can be configured to record various types of viewing behavior that occur on the receiver 110. For example, the monitor 334 can keep a log of events that are viewed via the receiver 110. In addition to identifying information, the log might contain the channel on which the event appears, whether the event is an episodic event (i.e., a series), the genre of the event (drama, comedy, mystery, etc.), how long a particular channel is watched, how often each channel is watched, and so forth. The monitored information is subsequently used by the download module 336 to determine whether a more detailed description should be acquired.

The download module 336 is configured to receive one or more of the levels of detail event descriptions 122-128 (FIG. 1) for one or more content events from the EPG server 112. As will be discussed in greater detail, below, a base layer EPG containing concise descriptions 122 for each event is initially downloaded. According to viewer behavior recorded by the monitor 334, the download module 336 downloads more detailed event descriptions 124-128 to replace the basic descriptions 122 for certain events.

Although shown separately, some of the components of the receiver 110 may be implemented in an application specific integrated circuit (ASIC). A system bus (not shown) typically connects the various components within the receiver 110.

Exemplary Event Description Data

FIG. 4 is an illustration of event information contained in a database of differing levels of detail. The first level of detail description 122 (FIG. 1) contains basic event information for each event displayed in the EPG user interface 113, hereinafter EPG 113. In the present example, the first level of detail description 122 for each event includes an event title 400, a very short description of the event 401, an event broadcast day 402 to identify which day(s) of the week the event will be shown, a start time 404 to identify a time that the event will be shown on the day(s) indicated, and a run time 406 that identifies a length of the event. It is noted that the first level of detail description 122 may contain more or less information than shown in the present example.

The second level of detail description 124 includes more detailed information than the information contained in the first level of detail description 122. The more detailed information included in the second level of detail description 124 may be added to the items included in the first level of detail description 122 or it may include only certain items of the first level of detail description 122. In the present example, the second level of detail description 124 contains all the items from the first level of detail description 122 plus additional information, including a more detailed synopsis 408 of the event. The additional information also includes a year that the event was originally released 410 and primary cast members 412 in the event. If the monitor 334 determines that the second level of detail description 124 is desired, the download module 336 receives the second level of detail description 124 from the EPG server 112. The second level of detail description 124 then replaces the first level of detail description 122 in the RAM 306 (FIG. 3).

It is noted that the second level of detail description 124 is not a strict superset of the first level of detail description 122. In other words, one or more item of information 400-406 contained in the first level of detail description 122 may be omitted from the second level of detail description 124. In addition, it is noted that in some implementations the second level of detail description 124 may supplement the information contained in the first level of detail description instead of replacing the entire first level of detail description.

Because the second level of detail description 124 requires more RAM 306 than the first level of detail description 122, the EPG event descriptions 307 are sized so that additional RAM 306 is available for adding more detailed descriptions for events. In another implementation, when the RAM 306 is full and a larger description needs to replace a smaller description, one or more base EPG descriptions are selectively deleted from the RAM 306 to make room for the larger description. The selection may be made on the basis of descriptions for events that are farthest away and/or descriptions for events that are not likely to be of interest to a user.

The third level of detail description 126 is even more detailed than the second level of detail description 124. In the example implementation shown, the third level of detail description 126 contains the information included in the second level of detail description 124 plus additional information, although this is not required in all implementations. Additional information includes a director/artist and/or producer 414 of the event and information about secondary cast members 416 in the event.

It is noted that particular event information contained in a higher level of detail description is not necessarily the same as similar event information included in a lower level of detail description. For example, the event synopsis 408 included in the third level of detail description 126 may not be identical to the event synopsis 408 included in the second level of detail description 124; it, for example, may be a more detailed event synopsis. In other words, each successive level of detail description is not necessarily strictly additive.

The fourth level of detail description 128 contains the information as the third level of detail description 116 plus additional information. The additional information includes other events in which the director/artist and/or producer is involved 418, other show times 420 that the event will be shown, and miscellaneous other information about the event, such as event ratings, characters, and so forth.

It is noted that the event synopsis 408 included in the second, third and fourth level of detail descriptions 122-128 may be more detailed in each progressive level. For example, the event synopsis 408 in the second level of detail description 424 may be a short paragraph while the event synopsis 408 in the third level of detail description 426 may be a longer paragraph or two. Furthermore, the event synopsis 408 in the fourth level of detail description 428 may include a few paragraphs.

It is also noted that the described implementation requires redundant information to be stored at the EPG server 112. This implementation assumes that EPG server 112 memory (not shown) is virtually unlimited. In another implementation, each successive level of detail description may only contain the information that is not found in previous levels of detail descriptions. For example, the second level of detail description 124 would only include the event synopsis 408, the year released 410 and the primary cast information 412. When the download module 336 requests a higher level of detail description, the higher level of detail description is downloaded together with each interim level of detail description, if any. For example, if the third level of detail description 126 is selected or received, the unique information contained in the second and third level of detail descriptions 122, 124 is downloaded and aggregated in the RAM 306. Although such an implementation saves memory space at the EPG server 112, it would also require downloading more than one file (in some instances) per request.

Methodological Implementation—EPG with Adjustable Descriptions

Figure 5:
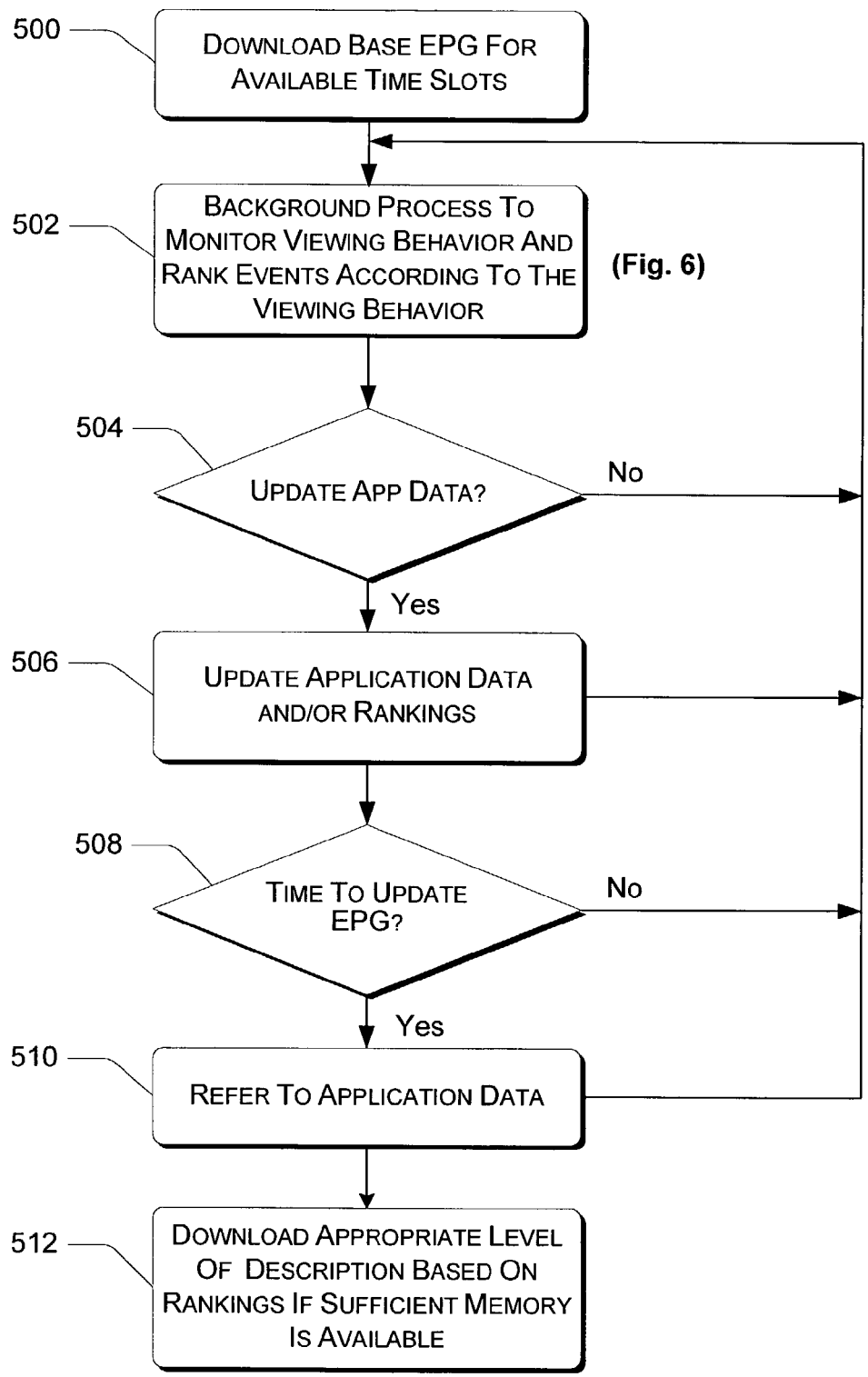
FIG. 5 is a flow diagram showing a methodological implementation described herein.
Figure 6:
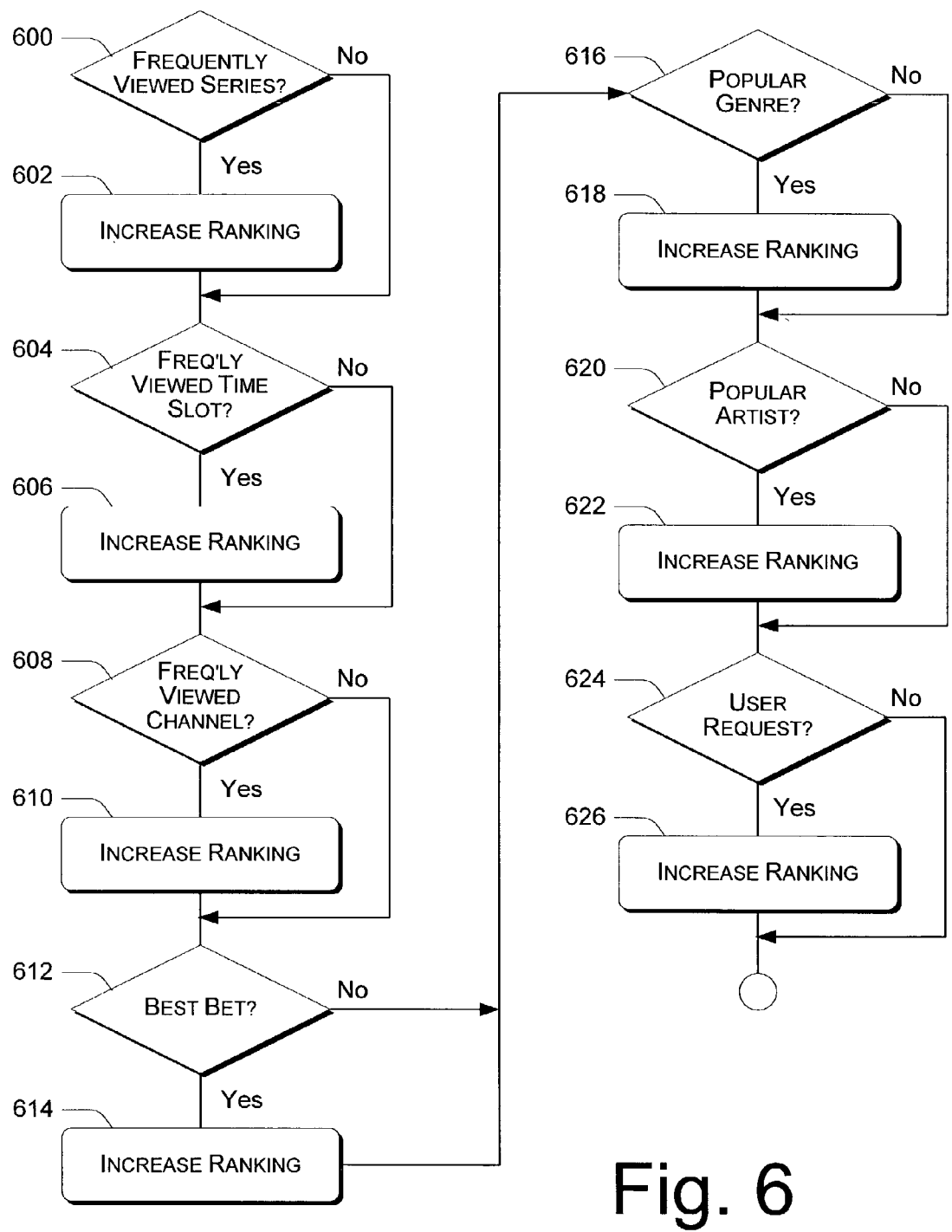
FIG. 6 is a flow diagram showing a methodological implementation described herein.

FIGS. 5 and 6 depict methodological implementations of the EPG with adjustable descriptions performed by the content distribution system 100 (or some portion thereof). These methodological implementations may be performed in software, hardware, or a combination thereof. In the discussion of FIGS. 5 and 6, continuing reference will be made to elements and reference numerals shown in FIGS. 1-4.

FIG. 5 depicts a process to collect data about viewing behavior. At block 500, the controller 332 of the EPG application 318 downloads a base EPG (i.e., the first level of detail description 122 for each event available in the EPG) from the EPG server 112 of the network operator 102 to memory.

At block 502, the monitor 334 of the EPG application 318 continuously monitors viewing behavior that occurs on the receiver 110. Although it is shown as a discrete step in FIG. 5, the monitoring process is a process that runs continuously. The monitoring continues even during the processing of the other steps shown in FIG. 5. The monitored data is then used to rank events for likely interest. FIG. 6 is a more detailed depiction of some examples of what is monitored and when rankings are updated.

Referring to FIG. 6, at block 600, the monitor 334 determines if the viewer has viewed one or more episodes of a serial event. If not ("No" branch, block 600), then rankings for future episodes of the serial event are not increased. (Rankings may be contained in the application data 315 of the receiver 110). If so ("Yes" branch, block 600), then the ranking for future episodes of the serial event are increased at block 602. The precise implementation of the ranking system may vary widely. As long as the rankings indicate a relative preference of events from which a decision can be made as to which level of detail description 122-128 should be downloaded for the event, the ranking process complies with one or more implementations described herein.

The controller 332 extracts data from the monitor such as the number of times a particular serial event has been viewed in the past, the most frequent viewing times and channels, most viewed genres, and so forth. The controller 332 then applies a weighting factor to each of these data to calculate a rank. It is recognized that the form of the ranking formula may vary widely from one implementation to the next depending on what data is collected by the monitor and which factors prove to be the most reliable predictors. One implementation may determine that the viewing of an episode of a serial is a very reliable indicator that a user may desire access to a high level of detail description for an event; however, this may prove to be a poor indicator in another implementation, say, in a different country where viewing habits are dissimilar.

In the present example, rankings may range from one (1) to ten (10). A ranking of one or two corresponds to the first level of detail event description 122; a ranking of three to five corresponds to the second level of detail event description 124; a ranking of six through eight corresponds to the third level of detail event description 126; and a ranking of nine or ten corresponds to the fourth level of detail event description 128. One implementation may determine-that the viewing of an episode of a serial is a very reliable indicator that a user may desire access to a high level of detail description for an event. In such a case, the ranking given to future episodes of the serial event may command a ranking of nine (9), indicating that the fourth level of detail event description 128 should be downloaded for the future episodes. In another implementation, it may be determined that this is not such a good indication and future episodes of the serial event may be ranked as a four (4), indicating that the second level of detail event description 122 should be downloaded for the future episodes.

It is noted that, although the present description applies ten rankings and has four levels of detail event descriptions, there does not have to be any particular correspondence between the two. For example, a ranking system may be used wherein an event is given a ranking from one to one hundred. Based on the ranking, one of, say, three levels of detail descriptions may be downloaded. Such variation in ranking implementation applies to all the ranking determinations described below and reference to one particular implementation is not intended to limit the scope of possible implementations available with the described systems and methods.

At block 604, the monitor 334 determines if the viewer views particular time slots more frequently than others. If not ("No" branch, block 604), then no event rankings for particular time slots need to be increased. If, however, the viewer typically watches events at certain times ("Yes" branch, block 604), then rankings for events in those particular times in the future are increased at block 606.

At block 608, the monitor 334 determines if the viewer views particular channels more frequently than others. If not ("No" branch, block 608), then no event rankings for particular channels need to be increased. If, however, the viewer typically watches events on particular channels ("Yes" branch, block 608), then rankings for events occurring on those particular channels in the future are increased at block 610.

At block 612, the monitor 334 determines if a future event has been designated as a "best bet" event by the network operator 102 (or some other source). If not ("No" branch, block 612), then no event rankings will be increased for best bets. If, however, there are events designated as best bets ("Yes" branch, block 612), then event rankings for the best bets identified are increased at block 614.

At block 616, the monitor 334 determines if the viewer views one or more particular event genres more frequently than others. If not ("No" branch, block 616), then no event rankings for particular genres will be increased. If, however, the viewer is determined to prefer one or more event genres ("Yes" branch, block 616), then rankings for future events of those particular event genres are increased at block 618.

At block 620, the monitor 334 determines if the viewer frequently views events in which a particular artist appears (artist may be an actor or a recording artist, in which case the event is not viewed, but listened to). If not ("No" branch, block 620), then no event rankings for events with the particular artist needs to be increased. If, however, the viewer frequently accesses events featuring a particular artist ("Yes" branch, block 620), then rankings for future events featuring the particular artist(s) are increased at block 622.

At block 624, if a user specifically requests a more detailed event description for a particular event or type of event (movies, sports, etc.), ("Yes" branch, block 624), then rankings for those specific events or types of events that occur in the future (at least as far as the EPG is concerned) are increased at block 626. If not ("No" branch, block 624), then no rankings for such events require an increase at block 626.

It is noted that the examples of situations that will trigger one or more ranking updates are not exhaustive. There may be many other situations in which particular implementations may update one or more rankings for future events included in the EPG 113.

Referring now back to FIG. 5, when a monitored condition occurs and the condition needs to be stored in the application data 315 ("Yes" branch, block 504), then the process continues at block 506. Otherwise, the background monitoring simply continues at block 502 ("No" branch, block 504).

At block 506, any updated rankings are stored in the application data 315. This step may be implemented either to store only updated rankings or to store all rankings, which will necessarily include any updated rankings.

If it is time to update the EPG 113, for example, when a half-hour or hour time period passes ("Yes" branch, block 508), then the download module 336 refers to the application data 315 at block 510 and uses the data to download the appropriate level of detail event description 122-128 (block 512). If there is insufficient memory to store a higher level of detail event description, then the download module 336 only downloads an event description that will fit in the available memory. This may require that the download module 336 forego downloading a higher level of detail event description.

In one implementation, the download module 336 is configured to delete one or more other event descriptions to make room for the higher level of detail event description. The determination as to which event description(s) to delete may be made according to the rankings (i.e. delete lower ranked event descriptions) or according to time slot (delete event descriptions for events more than forty-eight (48) hours away, or by some other method.

After the event descriptions in the EPG 113 are updated at block 512, the process reverts to block 504, where viewing behavior is monitored and events are ranked according to the viewing behavior. As long as it is not time to update the EPG ("No" branch, block 508, then the monitoring and ranking process continues at block 504.

Computer-Executable Instructions

An implementation of an EPG with adjustable descriptions may be described in the general context of computer-executable instructions, such as event modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Computer Readable Media

An implementation of an EPG with adjustable descriptions may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Client device (e.g., set top box) memory may thus be more efficiently utilized by implementation of the systems and methods described herein. As such, a user will be provided with a more pleasant interactive experience because an EPG will more than likely include higher level of detail descriptions for events in which the user is interested.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:
    downloading, by a client device, from a server into a memory of the client device an electronic programming guide (EPG) that includes multiple first level of detail event descriptions, one for each of multiple content events available through the EPG;
    using, by client device, client viewing behavior to predict events that are likely to be of interest to a user of the client device;
    for the predicted events, downloading, by the client device, from the server into the memory of the client device a respective second level of detail event description;

in response to downloading the second level of detail event descriptions, deleting, by the client device, the first level of detail event descriptions for the predicted events; and in response to downloading second level of detail event descriptions, selectively deleting, by the client device, event descriptions from the memory of the client device based on an amount of available memory space to store event descriptions.

2. The method as recited in claim 1, wherein the second level of detail event descriptions are more detailed than corresponding first level of detail event descriptions.

3. The method as recited in claim 1, further comprising:
rank ordering one or more of the multiple content events according to the client viewing behavior; and
downloading the second level of detail event descriptions based on the ranking.

4. The method as recited in claim 1, wherein the client viewing behavior comprises the client device accessing at least one episode of a content event series, which indicates that a second level of detail event description should be downloaded for one or more future episodes of the content event series.

5. The method as recited in claim 1, wherein the client viewing behavior comprises the client device frequently accessing a particular programming channel, which indicates that a second level of detail event description should be downloaded for one or more future events appearing on the particular programming channel.

6. The method as recited in claim 1, wherein the client viewing behavior comprises the client device detecting an event recommendation from a content provider, which indicates that a second level of detail event description should be downloaded for an event identified by the event recommendation.

7. The method as recited in claim 1, wherein the client viewing behavior comprises accessing at least a threshold number of events of a particular genre, which indicates that a second level of detail event description should be downloaded for one or more future events of the same genre.

8. The method as recited in claim 7, wherein the particular genre is a genre selected from the following list of genres: drama, comedy, science fiction, documentary, mystery, western, action, or suspense.

9. The method as recited in claim 1, wherein the client viewing behavior comprises a client request for a second level of detail event description for one or more events.

10. The method as recited in claim 1, wherein the first level of detail event descriptions comprise an event title and an event start time for particular events.

11. The method as recited in claim 1, wherein the client device is a television.

12. The method as recited in claim 1, wherein the client device is a set top box connected to a television.

13. The method as recited in claim 1, wherein the client device is a computing device.

14. The method as recited in claim 1, wherein the second level of detail event descriptions include all data contained in corresponding first level of detail event descriptions plus additional data.

15. The method as recited in claim 1, wherein the events are television programs.

16. The method as recited in claim 1, wherein the events are audio programs.

17. The method as recited in claim 1, wherein each second level of detail event description includes a brief summary of a respective event that is not included in corresponding first level of detail event descriptions.

18. The method as recited in claim 1, further comprising downloading a third level of detail event description for an event when indicated by client behavior, the third level of detail event description being more detailed than a corresponding second level of detail event description.

19. One or more computer storage memory devices containing computer-executable instructions that, when executed on a computer, perform the following steps:
downloading, by a client device, from a server into a memory of the client device an electronic programming guide (EPG) that includes multiple first level of detail event descriptions, one for each of multiple content events available through the EPG;
using, by the client device, client viewing behavior to predict events that are likely to be of interest to a user of the client device;
for the predicted events, downloading, by the client device, from the server into the memory of the client device a respective second level of detail event description;
in response to downloading the second level of detail event descriptions, deleting, by the client device, the first level of detail event descriptions for the predicted events; and
in response to downloading second level of detail event descriptions, selectively deleting, by the client device, event descriptions from the memory of the client device based on an amount of available memory space to store event descriptions.

20. The one or more computer storage memory devices as recited in claim 19, wherein the events comprise television programs.

21. The one or more computer storage memory devices as recited in claim 19, wherein the events comprise multimedia programs.

22. A client device, comprising:
a processor;
connection means to provide a connection between the client device and a broadcast network;
memory to store multiple event descriptions for events accessible by the client device over the broadcast network; and
an electronic programming guide (EPG) application configured to download an EPG over the broadcast network that displays event information for events available through the client device, the EPG containing a respective base level of detail event descriptions for each of the available events, the EPG application comprising:
a monitor configured to monitor events accessed by the client device to determine and record client device behavior;
a controller configured to determine that a user of the client device prefers an enhanced level of detail event description for an event available via the client device; and
a download module configured to:
download the enhanced level of detail event description for the event,
delete the base level of detail event description for the event, and
selectively delete event descriptions from the memory of the client device based on an amount of available memory space to store event descriptions such that at least one available event is left without an event description stored in memory.

23. The client device as recited in claim 22, wherein the enhanced level of detail event description for the event comprises at least a first and a second enhanced level of detail event descriptions, the first enhanced level of detail event description containing greater detail than the base level of detail event description, and the second enhanced level of detail event description containing greater detail than the first enhanced level of detail event description.

24. The client device as recited in claim 22, wherein the monitor is further configured to rank order one or more of the monitored events according to the recorded client device behavior; and the download module is further configured to download the enhanced level of detail event description based on the rank of an event.

25. The client device as recited in claim 22, wherein the monitor is further configured to determine when the client device accesses at least one episode of an event series; and the download module is further configured to download an enhanced level of detail event description for future episodes in the event series when the monitor determines that one episode of the series has been accessed.

26. The client device as recited in claim 22, wherein the monitor is further configured to determine when a particular channel is accessed frequently by the client device; and the download module is further configured to download an enhanced level of detail event description for one or more future events on a frequently accessed channel.

27. The client device as recited in claim 22, wherein the monitor is further configured to determine when an event is recommended by a content provider; and the download module is further configured to download an enhanced level of detail event description for events recommended by the content provider.

28. The client device as recited in claim 22, wherein the monitor is further configured to identify a particular event genre that is frequently accessed by the client device; and the download module is further configured to download an enhanced level of detail event description for events of a frequently accessed genre.

29. The client device as recited in claim 22, wherein the monitor is further configured to identify events selected by a user; and the download module is further configured to download an enhanced level of detail event description for events selected by the user.

30. The client device as recited in claim 22, further comprising a set top box housing.

31. The client device as recited in claim 22, further comprising a television.

32. The client device as recited in claim 22, further comprising a personal computing device.

33. The client device as recited in claim 22, wherein the download module is further configured to replace a base level of detail event description for the event with the enhanced level of detail description for the event when the enhanced level of detail description is downloaded.

* * * * *

UNITED STATES PATENT AND TRADEMARK OFFICE
CERTIFICATE OF CORRECTION

| | | |
|---|---|---|
| PATENT NO. | : 7,814,512 B2 | Page 1 of 1 |
| APPLICATION NO. | : 10/260255 | |
| DATED | : October 12, 2010 | |
| INVENTOR(S) | : Steven Wasserman | |

It is certified that error appears in the above-identified patent and that said Letters Patent is hereby corrected as shown below:

In column 12, line 62, in Claim 1, before "client" insert -- the --.

Signed and Sealed this
Tenth Day of May, 2011

David J. Kappos
*Director of the United States Patent and Trademark Office*